Nov. 1, 1938.   H. B. LUPIEN   2,134,949
MACHINE FOR CUTTING STRIP MATERIAL FOR SHOES
Filed June 1, 1936   10 Sheets-Sheet 1

Fig. 9.

Nov. 1, 1938.  H. B. LUPIEN  2,134,949
MACHINE FOR CUTTING STRIP MATERIAL FOR SHOES
Filed June 1, 1936  10 Sheets-Sheet 10

Inventor=
Henry B. Lupien
by Roberts, Cushman & Woodberry
att'ys.

Patented Nov. 1, 1938

2,134,949

UNITED STATES PATENT OFFICE 2,134,949

MACHINE FOR CUTTING STRIP MATERIAL FOR SHOES

Henry B. Lupien, Manchester, N. H., assignor to North American Holding Corporation, Syracuse, N. Y., a corporation of New York Application June 1, 1936, Serial No. 82,781

12 Claims. (Cl. 164—42)

This invention relates to a machine for automatically cutting measured lengths of strip material, such for example as braided, woven or the like strands used in the manufacture of footwear.

The principal object of the invention is to provide a machine which automatically and intermittently advances one end of a strip of material a predetermined distance beyond a cutting device and which automatically and intermittently actuates the cutting device to cut from the end of the strip the segment which has been fed. Other objects of the invention are to provide a machine which will automatically feed and cut off measured or predetermined lengths of strip material; to provide a simple and efficient means for accurately and quickly adjusting the feeding mechanism so that different lengths of material may be fed and cut off; and to provide a machine wherein the controls for the motor means are rendered inoperative until adjustments have been completed.

Further objects relate to the construction and mode of operation and will be apparent from a consideration of the following description and accompanying drawings which exemplify different embodiments of the invention chosen for the purposes of illustration.

In the drawings:

Fig. 8 is a partial section on the line 8—8 of Fig. 1;

Figures 4, 5:
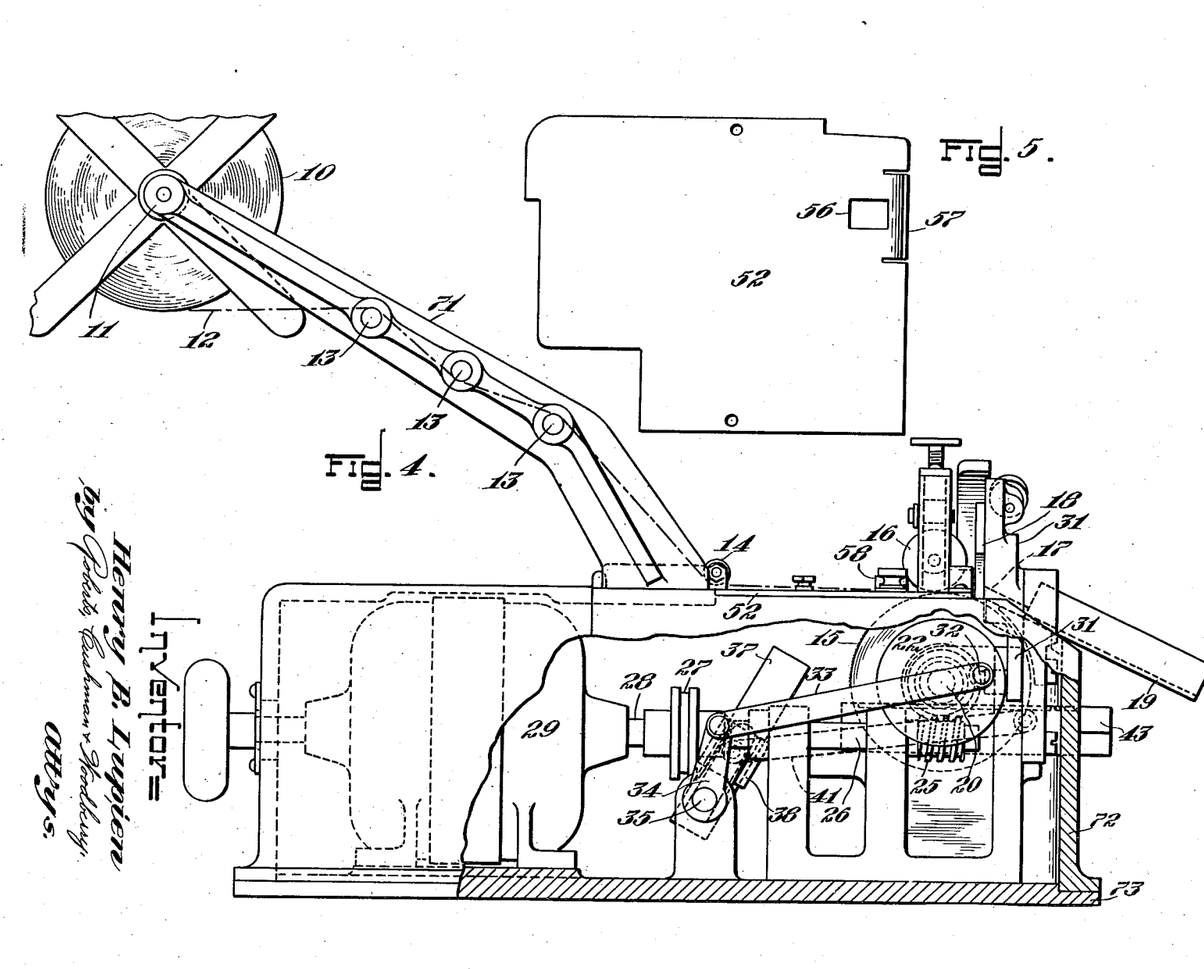
Fig. 4 is a side elevation with parts broken away and shown in section of the machine shown in Figs. 1 and 2.
Fig. 5 is a top plan view of the bed plate of the machine.
Figure 6:
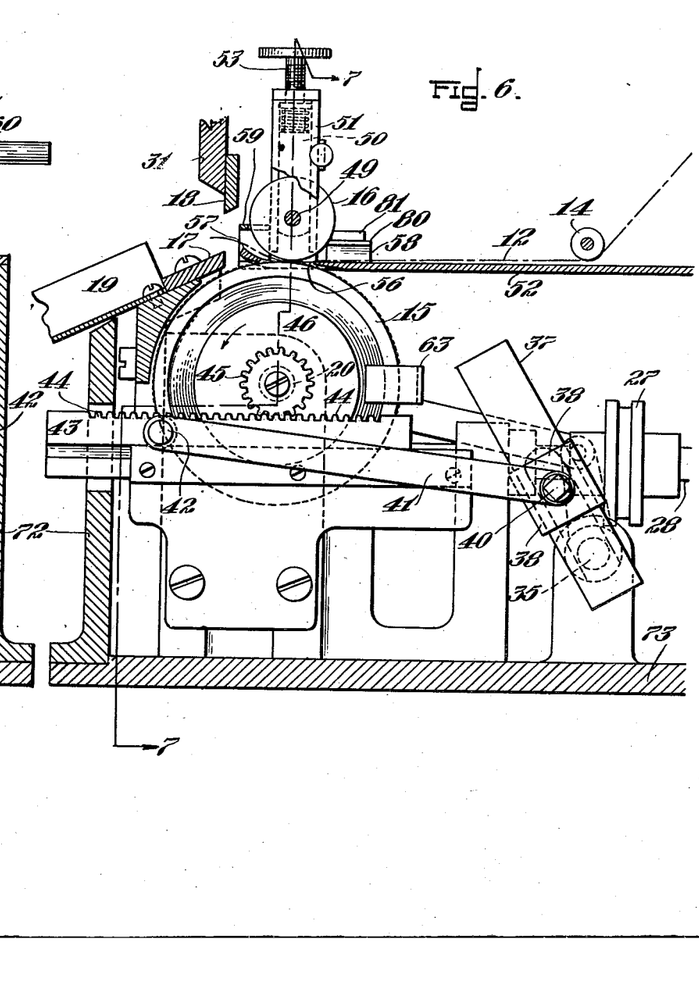
Fig. 6 is a partial section on the line 6—6 of Fig. 1.
Figure 7:
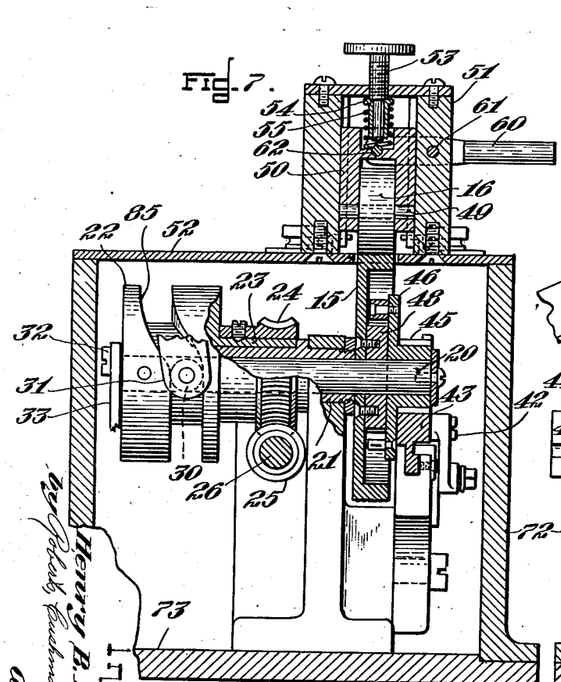
Fig. 7 is a section on line 7—7 of Fig. 6.

The embodiment of my invention illustrated in Figs. 1 to 8 comprises a bed plate 52 (Figs. 2 and 5) screwed to the top of the housing frame 72 which is fastened in any suitable manner to a base plate 73 (Figs. 4, 6 and 7). This housing frame encloses the motor 29 (Fig. 4) and most of the operating parts of the machine.

As shown in Figs. 5, 6 and 7 the bed plate 52 has an aperture 56 into which the adjoining peripheries of the feed roll 15 and the presser roll 16 extend. Between one end of this aperture 56 and the adjacent end of the bed plate an upwardly bent deflecting lip 57 is formed from the material of the bed plate. A lower knife blade 17 (Figs. 1 and 6) is firmly secured to the frame near the upturned end of the lip 57. A downwardly inclined chute 19 is attached to the frame on the opposite side of the lower knife blade from the lip 57.

The elongate strip of tape or webbing 12 is supplied from a roll 10 thereof (Figs. 1, 2 and 4) which is loosely mounted for rotation about the horizontal supporting spindle 11 carried by the upstanding bracket 71 which is secured to the frame of the machine. The roll 10 is held in position laterally on this supporting spindle by two spiders 68 and 69 (Fig. 1) each formed with an apertured hub mounted on the spindle 11 and provided with a set screw 70 by means of which each spider is removably and adjustably held in position on the spindle. The bracket 71 also carries horizontal tension and guide rods 13, said rods being substantially parallel to and of gradedly diminishing elevations relative to the supporting spindle 11.

A guide roller 14 (Figs. 2 and 4) is mounted upon the bed plate between the guide rods 13 and the adjacent end of the aperture 56. By means of set screws 81 (Figs. 2, 4 and 6) two angular guides 58 are secured to the upper surface of the bed plate near the end of the aperture 56 toward the guide roller 14, one of said guides adjacent each side of said aperture parallel thereto and extending from the end of the aperture toward the guide roller. The set screws 81 pass through elongate slots in the guides 58, said slots extending in a direction substantially at right angles from the sides of the aperture so that the distance between the inner faces of the guides may be varied by loosening the set screws and sliding the guides in the direction of the elongate slots. Each guide is provided with an overhanging lip 80 which extends from the top of the inner face thereof substantially parallel to the bed plate.

A sheet metal arch 59 (Figs. 1 and 6) is secured to the bed plate transversely of and directly above the deflecting lip 57, the upper edge of the lip and the middle portion of the arch cooperating to form a longitudinal slot.

To arrange the strip of material in readiness for operation of the machine the outer or free end of the strip 12 is threaded downwardly from the roll 10 between the guide rods 13 (Figs. 1, 2 and 4), under the guide roller 14, between the inner faces and beneath the overhanging lips of the guides 58, between the peripheries of the feed roll 15 and the presser roll 16 (Fig. 6), through the slot formed by the deflecting lip 57 and the arch 59 and finally over the lower knife blade 17. The inner faces and the overhanging lips of the guides 58 function to hold the strip from both lateral and vertical displacement and the deflecting lip 57 cooperates with the arch 59 to direct the end of the strip above and beyond the lower knife blade 17.

The presser roll 16 (Figs. 6 and 7) is rotatably mounted upon a spindle 49 carried by a yoke slide 50 slidable vertically in ways provided in the bracket 51 which is screwed to the top of the bed plate 52 bridging the aperture 56. The top of the bracket 51 is provided with a threaded aperture within which is mounted an abutment screw 53 the lower portion of which is of reduced diameter. A flanged thimble 54 is mounted around the reduced lower portion of the screw 53 and a coil spring 55 is mounted around the thimble, its upper end abutting the flange of the thimble (Fig. 7) and its lower end abutting the top of the yoke slide 50. This coil spring cooperates with the screw 53 to yieldingly press the periphery of the presser roll 16 downwardly against the top side of the strip 12 thereby holding the bottom side of the strip in frictional engagement with the periphery of the feed roll 15 (Figs. 6 and 7) said periphery of the feed roll being preferably knurled as indicated in Figs. 6 and 8. By adjustment of the screw 53 the downward pressure exerted by the presser roll may be varied.

A hand lever 60 (Fig. 7) is fulcrumed at 61 on the bracket 51 and one end of the lever is pivotally connected to the slide 50. By pressing the handle of the lever downwardly the slide 50 is raised against the pressure of the spring 55 providing a space between the peripheries of the presser roll 16 and the feed roll 15 and thereby permitting the end of the tape 12 to be passed between the peripheries of these rolls in threading the machine prior to operation.

The shaft 20 (Figs. 7 and 8) is rotatably supported within the fixed bearing sleeve 21. A cylindrical cam 22 is fixedly mounted upon one end of the shaft 20 and this cam has a hub extension 23 which is rotatably supported upon the periphery of the bearing sleeve 21. To the hub extension 23 a worm gear 24 (Figs. 7 and 8) is fixed and this worm gear is continuously driven in one direction by the intermeshing worm 25 (Figs. 4 and 7) fixed on one end of the shaft 26 which is journaled in bearings supported by the housing frame 72. The other end of the shaft 26 is connected by a universal joint coupling 27 with the armature shaft 28 of the electric motor 29. Thus the motor continuously rotates the cylindrical cam 22 at a uniform speed in one direction.

A cam groove 85 (Figs. 7 and 8) is provided in the periphery of the cylindrical cam 22.

Figure 1:
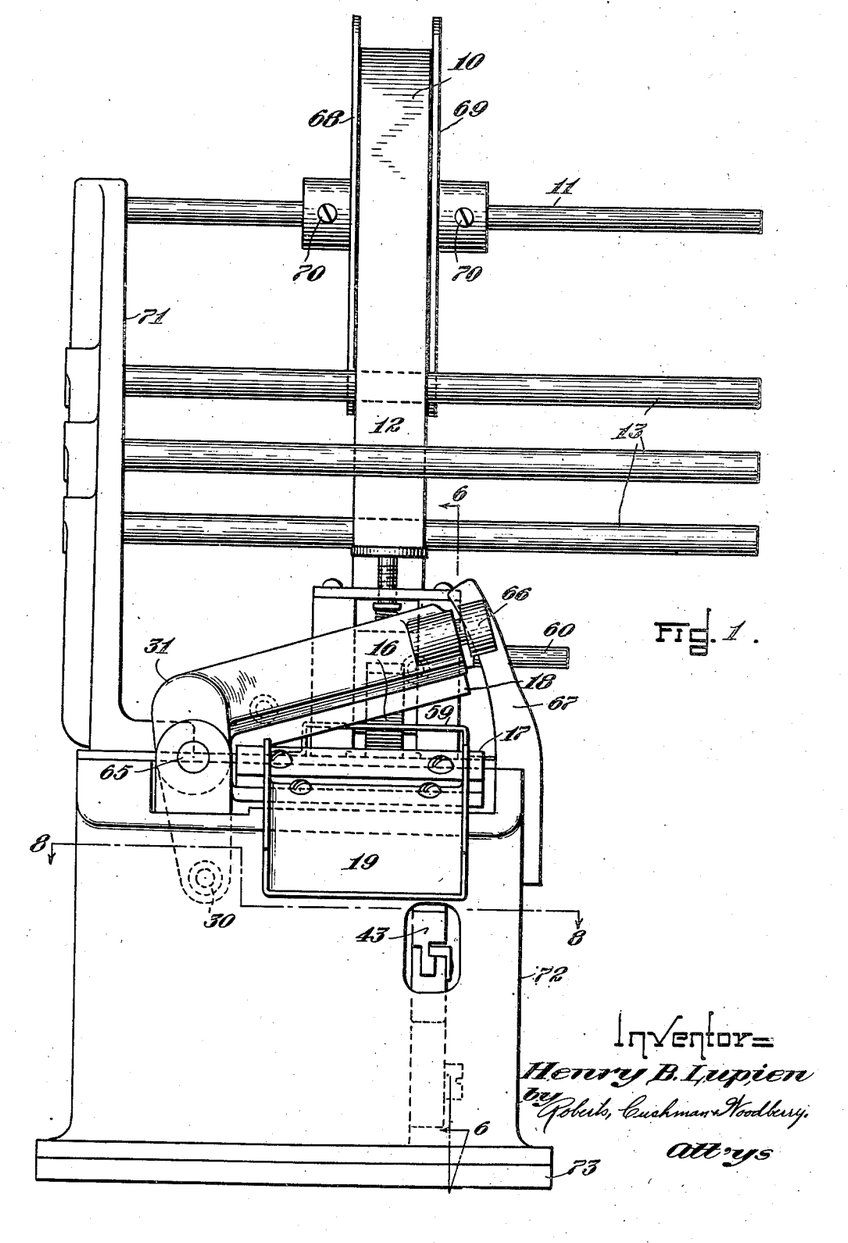
Fig. 1 is a front elevation of a machine embodying this invention.
Figures 2, 3:
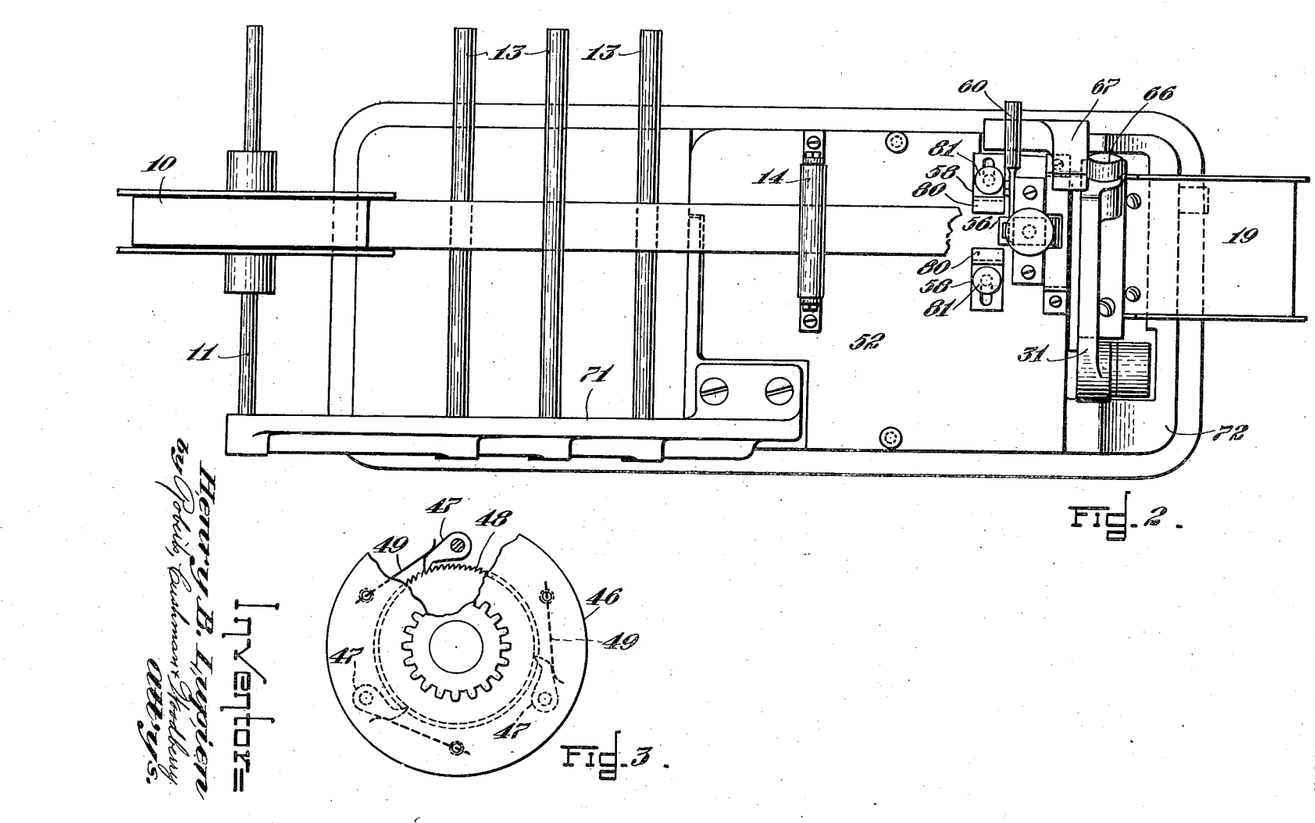
Fig. 2 is a top plan view of the machine shown in Fig. 1.
Fig. 3 is an elevation with parts broken away of a detail of the tape feeding mechanism.

A bell crank 31 (Figs. 1 and 2) is mounted on a fixed fulcrum 65 on a bracket forming part of the frame of the machine. The upper knife blade 18 (Figs. 1 and 6) is fixed to the upper arm of the bell crank and the follower roll 30 (Figs. 1 and 7) is rotatably mounted on the lower arm of the bell crank. The bell crank is mounted so that the upper knife blade 18 extends in a plane parallel to and in engaging position with one edge of the lower knife blade 17 as shown in Figs. 1 and 6 and so that the follower roll 30 extends into the cam groove 85 as shown in Figs. 7 and 8. As shown in Figs. 1 and 2 the knife carrying arm of the bell crank is provided at its extremity with a truck or roll 66 which rides upon a guide rail 67 forming part of the frame of the machine, said roll and guide rail cooperating to hold the upper knife blade 18 against the edge of the lower knife blade 17 during all positions of the bell crank. As the cylindrical cam 22 revolves the follower roll riding in the cam groove intermittently reciprocates or vibrates the bell crank 31 back and forth about its fulcrum 65 thereby intermittently lowering the outer end of the upper knife blade 18 into full engagement with the edge of the lower knife blade 17 and raising the outer end of the upper knife blade out of engagement with the edge of the lower knife blade. The path of the cam groove is preferably arranged so that during approximately one half of each revolution of the cylindrical cam the outer end of the upper knife blade is held elevated and at rest providing a space between the edges of the upper and lower knife blades adjacent the entire width of the upturned lip 57 through which the strip may be fed without contacting the upper knife blade, as shown in Fig. 1.

The feed roll 15 is loosely mounted upon the shaft 20 (Figs. 6, 7 and 8) for free rotation about said shaft. This feed roll 15 is intermittently rotated a certain number of degrees in one direction by the continuously rotating cylindrical cam 22 through certain connecting members hereinafter described.

A wrist pin 32 (Figs. 4, 7 and 8) pivotally connects one end of a link 33 to the outer end of the cylindrical cam 22. The other end of the link 33 is pivotally connected to an arm 34 which is fixed radially to one end of the transverse shaft 35 (Figs. 4 and 8) journaled for axial rotation in bearings supported by the base plate 73 of the machine. Fixed radially to the other end of the transverse shaft 35 is another arm 36 (Fig. 8), including as a rigid part thereof a rectangular plate portion 37 (Figs. 8, 4 and 6). A sleeve 38 (Figs. 8, 4 and 6) is slidably mounted on the plate 37 and is held at any desired radial distance from the axis of the shaft 35 by means of the adjustable clamping screw 40 (Figs. 6 and 8) which is threadedly mounted within an interiorly threaded stud 39. The inner end of the clamping screw 40 abuts the outer surface of the plate 37. By loosening the clamping screw 40 and sliding the sleeve 38 longitudinally along the plate 37 the radius of the arc described by the sleeve 38 about the axis of the shaft 35 during rotation thereof may be varied.

One end of the link 41 (Figs. 6 and 8) is pivotally connected by the stud 39 to the sleeve 38 and the opposite end of said link is pivotally connected at 42 to a rack 43 which is slidable back and forth horizontally in ways provided on the frame of the machine.

The top side of the rack 43 is provided with gear teeth 44 (Figs. 6, 7 and 8) meshing with a pinion 45 which is loosely mounted upon the shaft 20 for free rotation about said shaft. This pinion 45 has compounded with it a flange 46 (Figs. 3, 6 and 7) carrying three pawls 47 which are held in engagement with the teeth of a ratchet wheel 48 by springs 49 mounted on the flange 46 (Fig. 3). The ratchet wheel 48 is secured to the feed roll 15 (Fig. 7) and is loosely mounted upon the shaft 20 for free rotation with the feed roll 15 about said shaft.

As the motor continuously rotates the cam 22 the link 33 is thereby reciprocated back and forth and the link 33 continuously rotates the shaft 35 back and forth a certain number of degrees about its axis and this shaft 35 in turn rotates the plate 37 and the attached sleeve 38 back and forth a like number of degrees about the axis of the shaft 35. This rotation of the plate 37 and the sleeve 38 reciprocates the link 41 back and forth and this link 41 in turn reciprocates the attached rack 43 back and forth horizontally in its ways. This reciprocating movement of the rack 43 causes the pinion 45 to rotate about the shaft 20 a certain number of degrees first in one direction and then in the opposite direction. During rotation of the pinion in one direction the pawls 47 operatively engage the teeth of the ratchet wheel 48 and cause it and the attached feed roll 15 to rotate about the shaft 20 a predetermined distance, thereby advancing the strip 12, which is yieldably engaged by the periphery of the feed roll 15, a predetermined distance. During rotation of the pinion in the opposite direction the pawls 47 slide over the teeth of the ratchet wheel 48 and no rotary movement is imparted to either the ratchet wheel or the feed roll. A stationary spring yoke 63 (Figs. 6 and 8) is provided having a base portion firmly secured and held by screws 64 (Fig. 8). This yoke yieldingly grips the sides of the feed roll 15 and prevents overrunning of the feed roll.

It is thus apparent that the feed roll 15 is rotated a predetermined distance and the strip 12 is advanced a predetermined distance during substantially one half of each revolution of the cam 22 and during the balance of each revolution of the cam the feed roll and the strip remain stationary.

The path of the cam groove 85 and the position of the pivotal connection 32 between the end of the cam and the link 33 are arranged so that the outer portion of the upper knife blade 18 is out of engagement with the outer portion of the lower knife blade 17 during the interval of each revolution of the cam 22 when the strip 12 is being advanced thereby providing a space between upper and lower knife blades through which the strip may be freely fed during said interval of cam revolution.

As shown in Fig. 8 a port 74 is provided in the housing 72 opposite the plate 37 to allow access to the clamping screw 40 for varying the degrees of rotation of the feed roll 15 and for thereby varying the distance the end of the strip 12 is advanced between and beyond the knife blades 17 and 18 during each revolution of the cam.

As shown in Fig. 6 the metallic arch 59 which spans the path of the strip 12 prevents the strip from curling upwardly into a position behind the upper knife blade 18 as the strip is advanced.

From the foregoing description it will be apparent that an operator is required only to adjust the clamping screw 40 for the length of segments desired, and to maintain a supply of strip material in the roll 10. The machine automatically and intermittently feeds the end of the strip between and beyond the knife blades the desired distance, and automatically and intermittently cuts off the measured segments each of which is deposited by gravity upon the chute 19 whence it slides upon an adjacent work bench or into a convenient container.

Figure 9:
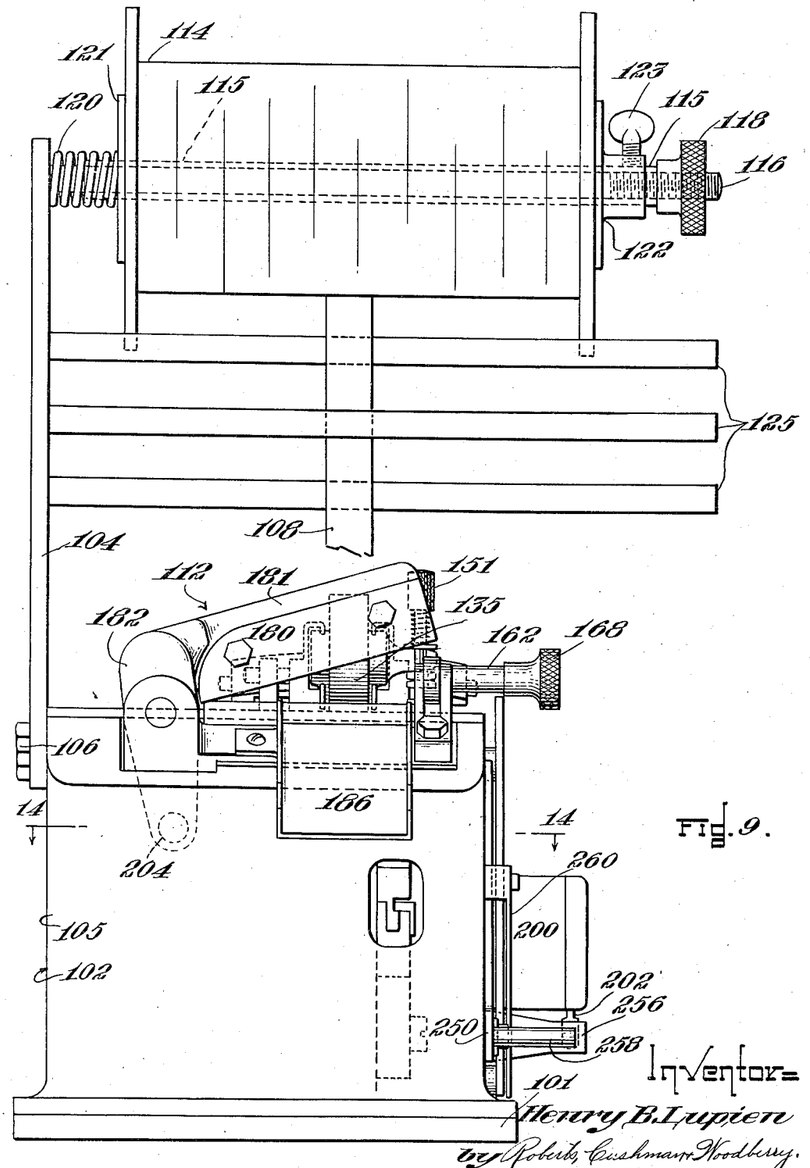
Fig. 9 is a front elevation of a machine of modified construction.
Figure 10:
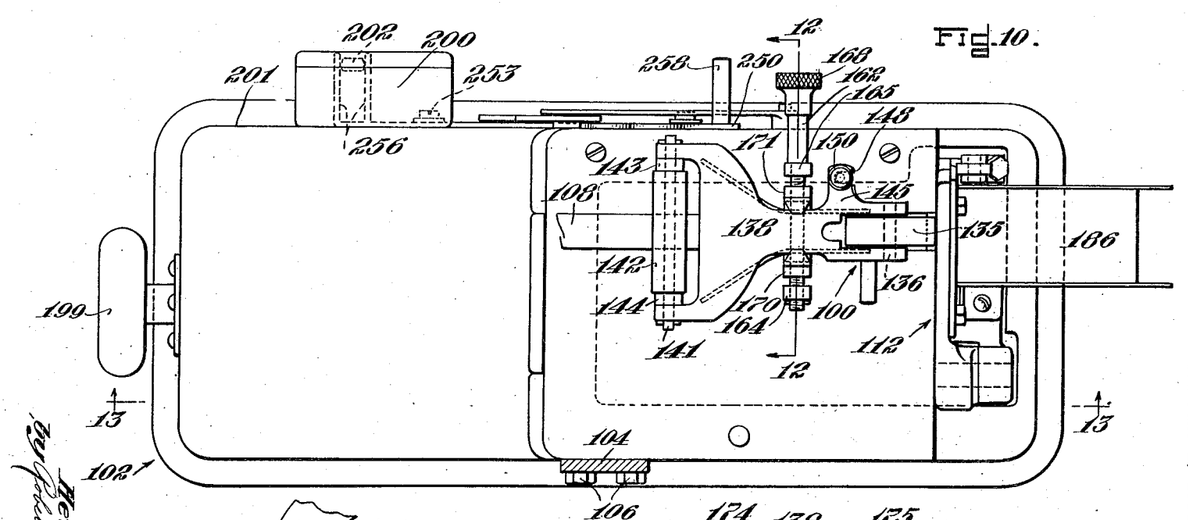
Fig. 10 is a plan view, with parts broken away and shown in section, of the machine shown in Fig. 9.

The embodiment shown in Figs. 9 to 17 comprises a base 101 (Figs. 9, 13 and 16) adapted to be supported on a bench, table or stand, and a housing 102 having a flanged periphery which tightly fits about a peripheral shoulder formed along the margin of the base. An upwardly and rearwardly extending arm 104 (Figs. 9, 10 and 13) is rigidly secured to a side wall 105 of the housing by screws or bolts 106 and this arm supports a suitable supply of strip material 108 which is drawn therefrom by a feeding mechanism, designated by the numeral 110 (Fig. 10), and fed to the severing means or cutters, designated by the numeral 112 (Figs. 9 and 10).

The supply comprises a roll or spool 114 (Fig. 9) mounted on a sleeve 115 rotatable on a spindle 116 which is rigidly secured to the end of the arm 104, the outer end of the spindle being threaded to receive a thumb nut 118 which engages the outer end of the sleeve 115. A spring 120 is interposed between the arm 104 and a washer 121 is disposed against the outer face of the inner flange of the spool 114 and a collar 122 engages the outer face of the flange on the opposite end of the spool, the collar 122 carrying a set screw 123 by means of which the collar may be locked to the sleeve 115 so that the thumb nut 118 may be adjusted to urge the spool 114 inwardly toward the arm 104. In this manner the spring 120 is effective yieldingly to restrain rotation of the spool, and by manipulating the nut 118 the action of the spring 120 on the spool may be varied as desired. A plurality of guiding and tensioning bars 125 are secured to the arm 104 between the housing 102 and the spool 114, these bars being effective to smooth out strip material being drawn from the supply, in addition to their guiding and tensioning functions.

Referring to Figs. 10, 13, 14, and 16, the feeding mechanism comprises an intermittently driven feed roll 130 which is free to rotate on a shaft 131 rotatably supported by an upstanding bracket 133 (Fig. 14) secured to the base. The upper part of the feed roll projects through an opening 132 (Fig. 16) formed in the top wall 134 of the housing so that its periphery is in substantially the same horizontal plane as the top of the housing. If desired, the periphery of the feed roll may be knurled or otherwise roughened to increase its frictional grip. A presser roll 135, cooperating with the fixed feed roll 130, is mounted on a spindle 136 carried by the free end of the arm 138 which is shaped to form a yoke. The arm 138 is pivotally mounted at its opposite end on the top wall 134 of the housing and is likewise bifurcated to form a yoke for supporting a spindle 141 which rotatably supports a guide roll 142 and pivotally connects the arm 138 with a pair of upstanding lugs 143 and 144 (Fig. 10) integral with the top wall of the housing. If desired, the presser roll 135 may be provided with a rubber tire, 146 (Figs. 13 and 16) or other means effective to produce an increased frictional grip on the strip material. The arm 138 is formed with a laterally projecting finger 145 (Figs. 10 and 17) adjacent to its free end and this finger is provided with a slot 148 which receives a latch device 150, comprising a stem 151 pivotally connected to a boss 152 integral with the top wall of the housing (Fig. 17). The lower end of the stem 151 is threaded to receive a stop nut 154 and a locking nut 155 and its upper part carries a spring 157 which acts against a washer 158 arranged to engage the margins of the slot 148 yieldingly to oppose upward movement of the arm 138. By turning the nuts 154 and 155 in one direction or another, the arm 138 may be held in different positions of adjustment by the latch 150 and, when desired, the latch may quickly be released merely by swinging the stem 151 out of the slot 148 to a position wherein the washer 158 is clear of the finger 145, in which case the arm 138 is free to be swung upwardly so that the presser roll 135 is moved out of position relative to the fixed roll 130.

Between its ends the arm 138 is formed with a transverse slot 160 (Figs. 12 and 16) which accommodates a screw shaft 162 rotatably mounted in upstanding lugs 164 and 165 integral with the top wall of the housing. The screw shaft 162 is provided with right-end threads 166 along its inner end and with left-hand threads 167 along its central portion (Fig. 12) the outer end of the shaft being provided with a thumb piece 168 by means of which it may be rotated. The threads 166 and 167 carry guide members 170 and 171, respectively, the guiding member 170 having an upstanding inner face 172, the front end of which is parallel to the corresponding inner face 173 of the guiding member 171. The rear ends of the guiding members diverge and terminate at points adjacent to the ends of the guide roll 142, as shown in Fig. 10. The guiding members are formed with upstanding fingers 174 and 175 which project above the arm 138 and terminate in inwardly directed ends in vertical alignment with the parallel faces 172 and 173 of the guide members, thus providing a gauge which indicates the width of the path defined by the inner faces of the guide members. By rotating the shaft 162 in one direction or another, the guide members 170 and 171 are moved toward or away from each other to provide a path of travel of the desired width. When the strip material 108 is drawn from the supply spool and across the tension bars 125, it is guided beneath the arm 138 by the guide roll 142 and guide members 170 and 171 and along a path extending directly to the feed rolls and thence to the severing means or cutters 112.

Figure 13:
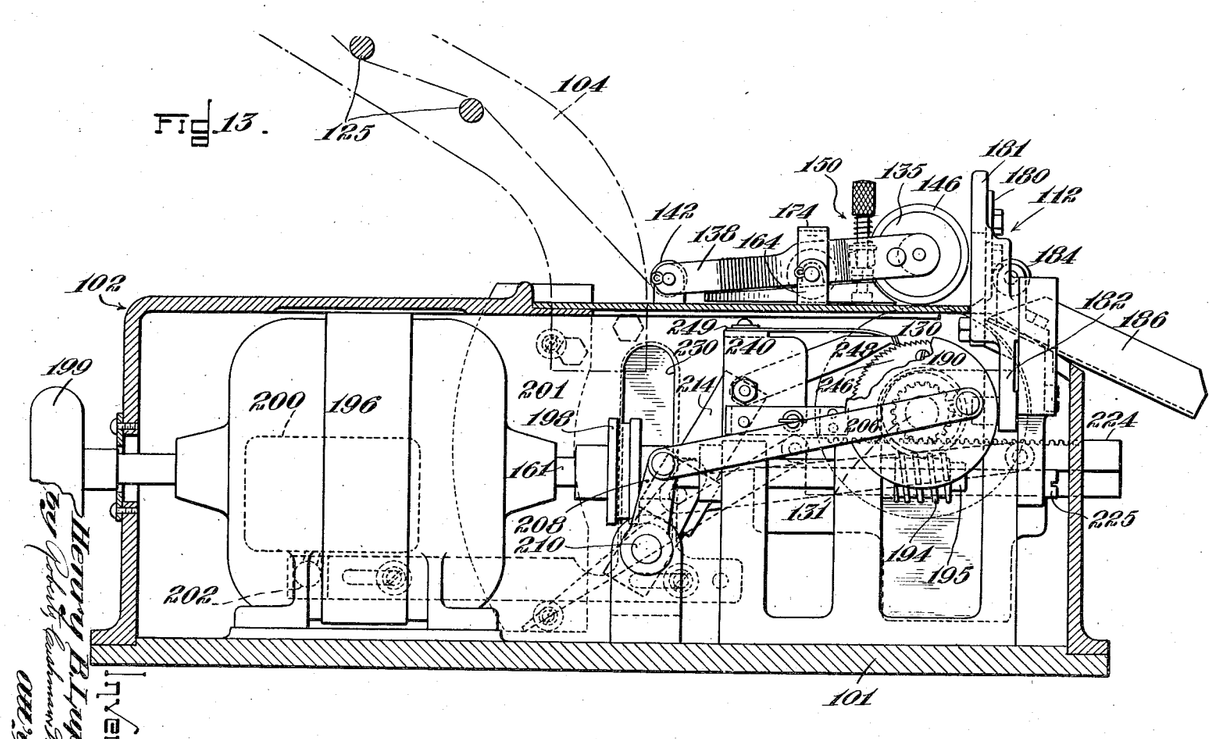
Fig. 13 is a section on the line 13—13 of Fig. 10.
Figures 16, 17:
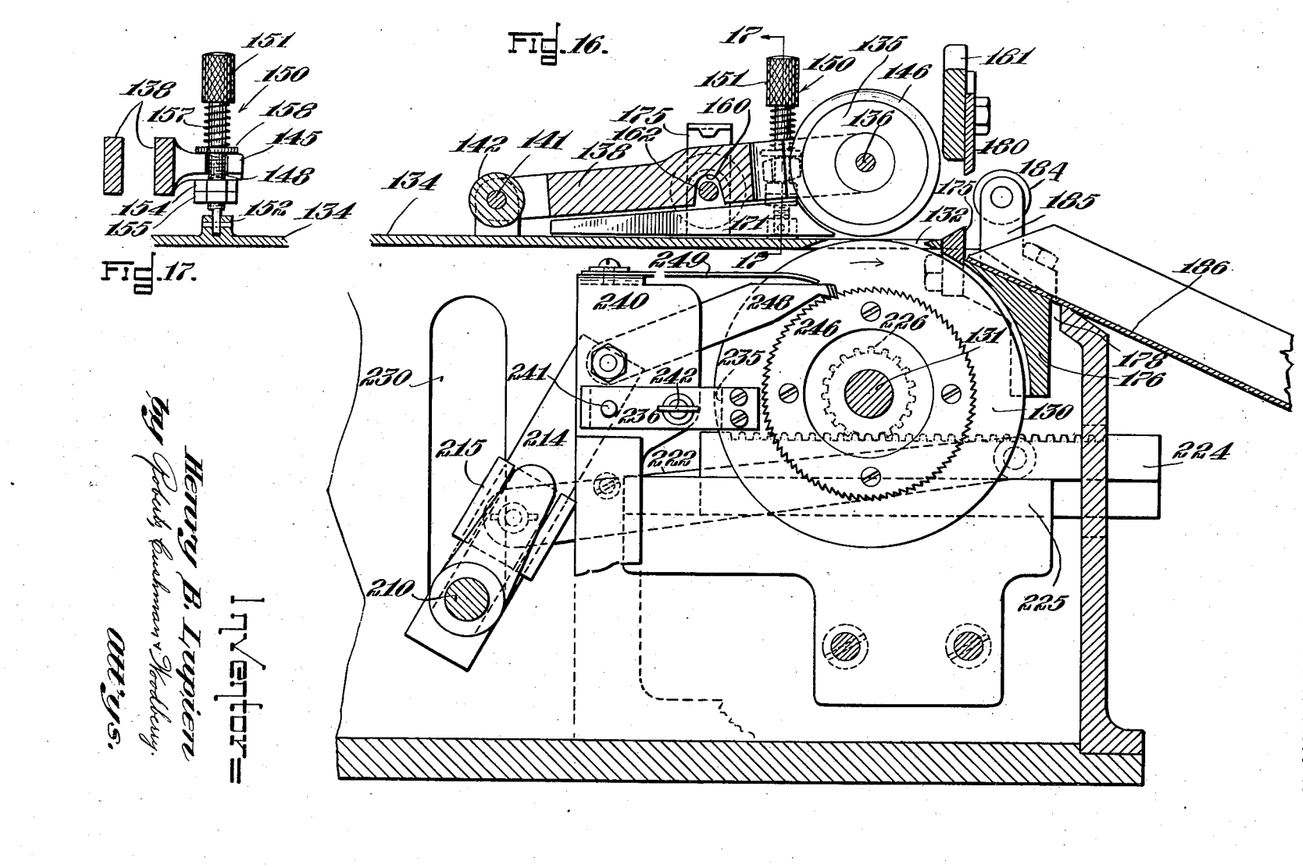
Fig. 16 is a section on the line 16—16 of Fig. 14.
Fig. 17 is a section on the line 17—17 of Fig. 16.

Referring to Figs. 9, 13 and 16, the severing means 112 comprise a stationary cutter or knife 175 (Fig. 16) bolted or otherwise rigidly secured to a block 176 disposed in an opening 178 in the front of the top wall 134, and a reciprocating knife 180 bolted or otherwise secured to one arm 181 of a bell crank 182. Beyond the cutters is a guide roll 184 rotatably mounted in upstanding lugs 185 secured to the block 176. A delivery chute 186 is rigidly secured to the block 176 in alignment with the feeding rolls 130 and 135 so that strip material 108 fed to the cutters passes under the guide roll 184 and drops into the chute 186 when sheared off by the cutters.

Figures 14, 15:
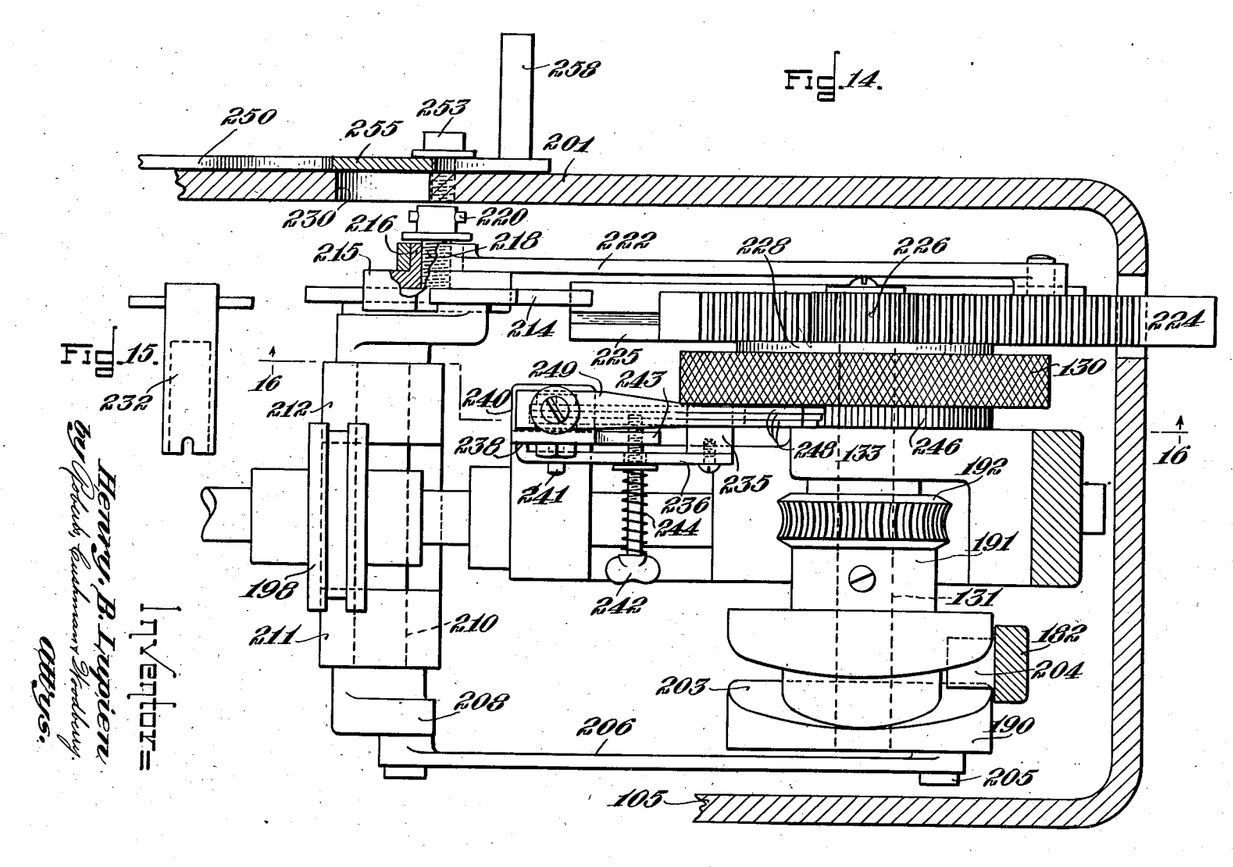
Fig. 14 is an enlarged section on the line 14—14 of Fig. 9.
Fig. 15 is an elevation of the socket wrench for use in adjusting the strip feeding mechanism.

The feeding means 110 and severing means 112 are operated in timed relation to each other by an actuating mechanism disposed within the housing 2. Referring to Figs. 13, 14 and 16, the actuating mechanism is substantially the same as that of the previously described embodiment and comprises a cylindrical cam 190 mounted on one end of the shaft 131 and a worm gear 192 (Figs. 13 and 14) keyed or otherwise secured to the shaft 131 and disposed contiguous to the hub 191 of the cam. The gear 192 meshes with a worm 194 (Fig. 13) carried by a drive shaft 195 which is continuously driven by a motor 196 connected thereto by a flexible coupling 198. The rear end of the motor shaft projects outwardly through an opening in the rear wall of the housing (Figs. 10 and 13) and supports a hand wheel 199 by means of which the motor, drive shaft and associated parts may be manually rotated so as to bring certain parts of the mechanism in a position to make adjustments hereinafter described. The operation of the motor is controlled by an electric switch disposed within a switch box 200 (Fig. 11) which is located on the side wall 201 of the housing, the operating lever 202 of the switch projecting downwardly from the switch box, as shown in Figs. 9 and 10.

The cam 190 is formed with a groove 203 which receives a pin or follower 204 (Fig. 14) carried by the lower arm of the bell crank 182. The cam is so designed that one complete revolution effects a reciprocation of the knife 180 from elevated position (Fig. 16) to shearing position and back to elevated position, such reciprocation taking place during a period less than one-half the time required for a complete revolution of the cam.

The outer end of the cam carries an eccentric pin 205 (Fig. 14) which is connected by a link 206 to a crank 208 secured to one end of a shaft 210 which is journaled in bearings 211 and 212 secured to the base. The shaft 210 extends from one side of the housing, beneath the drive shaft 195, to the opposite side of the housing. The other end of the shaft 210 carries a crank arm 214 on which is slidably mounted a block 215 (Fig. 16). The block 215 is formed with a laterally projecting sleeve or collar 216 (Fig. 14) having a threaded bore which receives a set screw 218 whose outer end is provided with a gripping pin or dog 220 by means of which the set screw may be rotated to lock the block 215 at any position along the arm 214. A connecting rod 222 is pivotally secured at one end to the sleeve 216 and at its opposite end to a rack 224 slidably mounted longitudinally of the housing in a slideway 225 which is rigidly secured to the base or other parts of the housing. The rack 224 meshes with a pinion 226 rotatably mounted on shaft 131 and this pinion is secured to a one-way clutch mechanism designated by the numeral 228, (Fig. 14) the clutch mechanism preferably being of the type previously described and being associated with the feed roll 130 so that it is rotated step by step, in the direction of the arrow (Fig. 16), in response to reciprocation of the rack in one direction.

The parts are so designed that the feeding movement of the roll 130 takes place during the period between reciprocations of the knife 180, so that when the strip 108 is being advanced, the knife 180 is in elevated position (Fig. 16) and descends to shear off the strip when the feed roll 130 is at rest. The feeding movement is governed by the travel or stroke of the connecting rod and rack which, in turn, are governed by the position of the block 215 relative to the axis of rotation of the shaft 210. Hence, by loosening the set screw 218 and sliding the block 215 along the arm 214, toward or away from the shaft 210, the travel of the rack may be decreased or increased and in this manner the feeding movement of the roll 130 may be varied as desired.

In order to provide for such adjustment the side wall 201 is formed with a vertically extending slot 230 (Figs. 11, 13, 14 and 16) in alignment with the arm 214 when in vertical position, the width of the slot being sufficient to permit a socket wrench 232 (Fig. 15) to be inserted so as to tighten or loosen the set screw 218 and move the block 215 along the arm 214 to the desired position. In making such adjustment the arm 214 is first brought into a vertical position by manually rotating the hand wheel 199.

As the feeding operation is intermittent, it is desirable to provide means for preventing the roll 130 from over-running and to this end I provide a brake device which comprises a fiber brake shoe 235 (Fig. 14) which engages the inner face of the feed roll 130, the brake shoe being secured to one end of a brake lever 236 fulcrumed at 238 to an upstanding bracket 240 which is secured to the base. A guide pin 241, secured to the bracket 240, holds the lever 236 in position and a thumb screw 242, mounted on an arm 243 which is secured to the bracket 240, carries a spring 244 which yieldingly urges the lever 236 toward the feed roll 130, thus yieldingly holding the brake shoe 235 in engagement with the feed roll 130.

In order to prevent backward movement of the feed roll 130, due to the drag of the strip material, a ratchet wheel 246 (Figs. 13, 14 and 16) is secured to the inner face of the feed roll and a plurality of detents or pawls 248 having different lengths are pivotally secured to the bracket 240 so as to cooperate with the ratchet wheel 246. A leaf spring 249 secured to the top of the bracket 240 holds the pawls in engagement with the ratchet wheel. The difference in length between the longest and shortest pawl is less than the circumferential distance between the teeth of the ratchet wheel, so that any backward movement of the ratchet wheel and feed roll is limited to a small fraction of the circumferential distance between the teeth, which is negligible from a practical standpoint.

Figure 11:
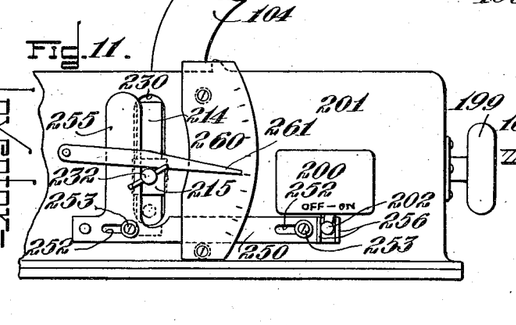
Fig. 11 is a fragmentary side elevation, on a reduced scale, of an end portion of the modified machine, showing the power control device and the method of adjusting the feeding mechanism.
Figure 12:
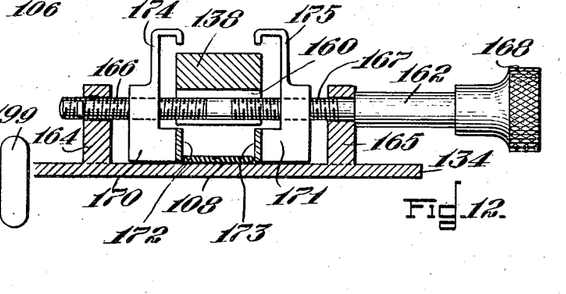
Fig. 12 is an enlarged section on the line 12—12 of Fig. 10.

Referring to Figs. 9, 10, 11 and 14, the operation of the machine is controlled by a slide bar 250 mounted on the outside of the wall 201 of the housing. The slide bar 250 is formed with spaced slots 252 (Fig. 11) which receive screws 253 or like elements which slidably support the bar 250 for movement longitudinally of the housing, and an upstanding arm 255 integral with the bar 250 and contiguous to the face of wall 201 provides a closure for the slot 230. The rear end of the slide bar 250 is formed with a pair of outwardly projecting lugs 256 (Figs. 9, 10 and 11) which receive the switch lever 202, and the opposite end of the slide bar is provided with an operating handle 258 by means of which the slide bar may be slid from one position to another. The parts are so designed that when the slide bar is slid from its forward position (wherein the closure 255 is clear of the slot 230 and the switch lever 202 is in "off" position, as shown in Fig. 11) to its rearward position, the switch is thrown on and the closure 255 moved to a position wherein it closes the slot 230. With this construction and arrangement the motor can not be put into operation when adjustments are being made as the socket wrench 232, when inserted through the slot 230, blocks the movement of the closure 255 and hence prevents the switch from being thrown on.

In order to determine the setting of the feed actuating mechanism, I provide means for indicating the position of the block 215 relative to the axis of rotation of the shaft 210, and to this end a scale or index 260 (Fig. 11) is secured to the rearward side of the slot 230 and a pointer 261, cooperating with the scale 260, is pivotally mounted on the opposite side of the slot so that it may be supported by the socket wrench 232 when inserted through the slot, as shown in Fig. 11. When the arm 214 is brought to a vertical position, that is, in alignment with the slot 230, and the socket wrench 232 is in engagement with the head 220 of the set screw 218, the pointer 261 may be rotated to a position wherein it is supported by the wrench 232, indicating the position of the block relative to the axis of the shaft 210 (Fig. 11) which position, as previously pointed out, determines the feeding movement of the roll 130. Hence, the pointer indicates on the scale 260 the particular feeding movement of roll 130 for any position of adjustment of the block 215 on the arm 214, and accordingly the scale 260 may be graduated in units of or designating the linear feed of the roll 130 for each actuation of the rack 224.

In operating the machine the strip material 108 is first drawn from the spool 114, under and over the tensioning bars 125, thence along under the guide roll 142 and between the guide members 170 and 171 to the rolls 130 and 135, the latch 150 being released so as to permit the arm 138 to be swung upwardly to facilitate feeding the strip between the rolls 130 and 135. The latch 150 may then be replaced and the nuts 154 and 155 (Fig. 17) adjusted in accordance with the thickness of the strip material so that the presser roll 135 is held in proper position relative to the feed roll 130. Either before or after making these adjustments, the block 215 may be adjusted in a manner previously explained so as to produce the desired linear feed. The machine may then be set in operation by sliding the bar 250 rearwardly.

When the machine is in operation, the cam 190 is continuously driven and for each rotation of the cam, the cutters are actuated. The feed roll 130 being driven by mechanism actuated by the cam, necessarily operates in timed relation to the cutters and, as previously explained, the actuating mechanism associated with the feed 130 is so designed that the feeding movement takes place only between successive actuations of the cutters. Thus, when the knife 180 is in elevated position (Fig. 17), the feed roll 130 is operated to advance the strip 18 a predetermined distance beyond the knife 175, whereupon the feed roll stops and the knife 180 descends to shear off the strip. As soon as the knife 180 is raised, the feed roll again operates to advance the strip 108 a predetermined distance beyond the knife 175. The strip 108 after passing the knife 175, strikes the guide roll 184 and is deflected downwardly into the chute 186 so that upon being severed it drops from the chute into a receptacle.

While I have shown and described two desirable embodiments of the invention, it is to be understood that this disclosure is for the purpose of illustration only and that various changes in shape, proportion and arrangement of parts, as well as the substitution of equivalent elements for those herein shown and described, may be made without departing from the spirit and scope of the invention as set forth in the appended claims.

I claim:

1. Apparatus for cutting strip material for shoes, comprising feeding means to intermittently advance the end of an elongate strip a predetermined distance, and severing means to intermittently cut a segment from the end of said strip, said severing means comprising a bell crank pivotally mounted intermediate its ends on a fixed fulcrum, a cutting blade secured to said bell crank adjacent one end thereof, a follower secured to said bell crank adjacent the other end thereof, a cylindrical cam having a groove engageable with said follower, and means for rotating said cam, said cam and follower being constructed and arranged to cause said bell crank to reciprocate about said fulcrum during revolution of the cam thereby causing said cutting blade to intermittently cut a segment from the end of said elongate strip, said feeding means being operated automatically when said cutting blade is out of severing engagement with said strip.

2. Apparatus for cutting strip material for shoes, comprising feeding means to intermittently advance the end of an elongate strip a predetermined distance, adjusting means associated with said feeding means to vary the distance which the end of said strip is advanced during each intermittent action of the feeding means, and severing means to intermittently cut a segment from the end of said strip, said severing means comprising a bell crank pivotally mounted intermediate its ends on a fixed fulcrum, a cutting blade secured to said bell crank adjacent one end thereof, a follower secured to said bell crank adjacent the other end thereof, a cylindrical cam having a groove engageable with said follower, and means for rotating said cam, said cam and follower being constructed and arranged to cause said bell crank to reciprocate about said fulcrum during revolution of the cam thereby causing said cutting blade to intermittently cut a segment from the end of said elongate strip, said feeding means being operated automatically when said cutting blade is out of severing engagement with said strip.

3. Apparatus for cutting strip material for shoes comprising severing means operative to cut a length of strip material, a motor for operating said severing means, and feeding means for advancing said strip material to said severing means, said feeding means including cooperating rolls, a reciprocating arm associated with said motor so as to be reciprocated thereby, a block adjustably mounted on said arm, a clutch associated with one of said rolls for rotating it in strip advancing direction, and connecting means between said block and clutch operative to effect rotation of said roll in strip advancing direction in response to reciprocation of said arm in one direction.

4. Apparatus of the class described comprising a housing having an opening in one wall, feeding and severing means for cutting off predetermined lengths of strip material, and mechanism for operating said feeding and severing means located within said housing, said mechanism including an adjustable member located adjacent to said opening and movable from one position to another to vary the feeding movement of the feeding means, means insertable through said opening to adjust the position of said member, and index means including a scale and a pointer pivotally mounted to cooperate with the adjusting means so as to indicate on said scale the feeding movement of said feeding means for any position of adjustment of said member.

5. Apparatus of the class described comprising a housing having an opening in one wall, feeding and severing means for cutting off predetermined lengths of strip material, and mechanism for operating said feeding and severing means located within said housing, said mechanism including an adjustable member located adjacent to said opening and movable from one position to another to vary the feeding movement of the feeding means, means insertable through said opening to adjust the position of said member, and index means including a scale extending along the marginal portions at one side of the said opening and a pointer pivotally mounted on the opposite side of said opening so as to cooperate with said adjusting means when inserted through said opening to indicate the feeding movement of said feeding means for any position of adjustment of said member.

6. Apparatus of the class described comprising a housing having an elongate slot in one wall, feeding and severing means for cutting off predetermined lengths of strip material, and mechanism for operating said feeding and severing means located within said housing, said mechanism including a motor, an adjustable member located adjacent to said slot and movable in approximately the same general direction as the longitudinal extent of said slot to vary the feeding movement of the feeding means, means insertable through said slot to adjust the position of said member, a switch lever for said motor located on the outside of said housing, a closure for said slot movable to closed position only upon the removal of said adjusting means from said slot, and connections between said closure and switch operative to actuate the switch in response to closing movement of said closure.

7. Apparatus of the class described comprising a housing having an elongate slot in one wall, feeding and severing means for cutting off predetermined lengths of strip material, and mechanism for operating said feeding and severing means located within said housing, said mechanism including a motor, an adjustable member located adjacent to said slot and movable in approximately the same general direction as the longitudinal extent of said slot to vary the feeding movement of the feeding means, means insertable through said slot to adjust the position of said member, a switch lever for said motor located on the outside of said housing, a closure slidably mounted to move to a position closing said slot only upon the removal of said adjusting means, and an arm connecting said closure and switch, said arm being operative to actuate the switch in response to closing movement of said closure.

8. Apparatus of the class described comprising severing means operative to cut a length of strip material, and feeding means for advancing said strip material to said severing means, said feeding means comprising a fixed roll, means for rotating said fixed roll, an arm pivotally mounted at one end about an axis parallel to the axis of rotation of said fixed roll, a presser roll rotatably supported adjacent to the free end of said arm and arranged to cooperate with said fixed roll, a guide roll rotatably supported at the opposite end of said arm and arranged to guide strip material under said arm, and a spring-pressed releasable latch engaging said arm between its pivotal support and said presser roll, said latch being effective yieldingly to urge said presser roll into engagement with said fixed roll.

9. Apparatus of the class described comprising severing means operative to cut a length of strip material, and feeding means for advancing said strip material to said severing means, said feeding means comprising a fixed roll, means for rotating said fixed roll, an arm pivotally mounted at one end to swing toward and away from said fixed roll, a presser roll rotatably mounted at the free end of said arm and arranged to swing toward and away from said fixed roll and to cooperate therewith in feeding strip material to said severing means, a shaft rotatably mounted beneath said arm, and means carried by said shaft for guiding strip material along a path extending beneath said arm and toward said rolls.

10. Apparatus for cutting strip material for shoes, comprising feeding means to intermittently advance the end of an elongate strip a predetermined distance, and severing means to intermittently cut a segment from the end of said strip, said severing means comprising a bell crank pivotally mounted intermediate its ends on a fixed fulcrum, a cutting blade secured to said bell crank adjacent one end thereof, a follower secured to said bell crank adjacent the other end thereof, a cylindrical cam having a groove engageable with said follower, and means for rotating said cam, said cam and follower being constructed and arranged to cause said bell crank to reciprocate about said fulcrum during revolution of the cam thereby causing said cutting blade to intermittently cut a segment from the end of said elongate strip, said feeding means comprising a feed roll and a presser roll which yieldably grip said strip, a ratchet wheel attached to said feed roll and rotatable therewith, a pinion mounted for rotation in both directions adjacent said ratchet wheel, a pawl mounted on said pinion and engageable with the teeth of said ratchet wheel during rotation of the pinion in one direction only, a rack having teeth engageable with the teeth of said pinion, a link pivotally attached to said rack, a shaft mounted for rotation in both directions about its axis, an arm attached to one end of said shaft and extending radially therefrom, a sleeve slidable longitudinally of said arm, releasable means for holding said sleeve on said arm at any desired radial distance from the axis of said shaft, a pivotal connection between said sleeve and said link, and means for rotating said shaft back and forth a predetermined number of degrees about its axis, the rotation of said shaft being timed to revolve said pinion in the direction in which said pawl is engageable with the teeth of said ratchet wheel when said cutting blade is out of severing engagement with said strip.

11. Apparatus for cutting strip material for shoes, comprising feeding means to intermittently advance the end of an elongate strip a predetermined distance, and severing means to intermittently cut a segment from the end of said strip, said severing means comprising a bell crank pivotally mounted intermediate its ends on a fixed fulcrum, a cutting blade secured to said bell crank adjacent one end thereof, a follower secured to said bell crank adjacent the other end thereof, a cylindrical cam having a groove engageable with said follower, and means for rotating said cam, said cam and follower being constructed and arranged to cause said bell crank to reciprocate about said fulcrum during revolution of the cam thereby causing said cutting blade to intermittently cut a segment from the end of said elongate strip, said feeding means comprising a feed roll and a presser roll which yieldably grip said strip, a ratchet wheel attached to said feed roll and rotatable therewith, a pinion mounted for rotation in both directions adjacent said ratchet wheel, a pawl mounted on said pinion and engageable with the teeth of said ratchet wheel during rotation of the pinion in one direction only, a rack having teeth engageable with the teeth of said pinion, a link pivotally attached to said rack, a shaft mounted for rotation in both directions about its axis, two arms one attached to each end of said shaft and extending radially therefrom, a pivotal connection between one of said arms and said link, a second link pivotally connected to the other arm, a pivotal connection between the second link and the end of said cylindrical cam, said pivotal connection being located at a lesser radial distance from the axis of said cam than the radial distance between the axis of said shaft and the pivotal connection between the second link and its adjacent arm, whereby said shaft is rotated back and forth a predetermined number of degrees about its axis during each revolution of said cam, said cam groove and said pivotal connection between the second link and the end of the cam being constructed and arranged to revolve said pinion in the direction in which said pawl is engageable with the teeth of said ratchet wheel while said cutting blade in out of severing engagement with said strip.

12. Apparatus for cutting strip material for shoes, comprising feeding means to intermittently advance the end of an elongate strip a predetermined distance, and severing means to intermittently cut a segment from the end of said strip, said severing means comprising a bell crank pivotally mounted intermediate its ends on a fixed fulcrum, a cutting blade secured to said bell crank adjacent one end thereof, a follower secured to said bell crank adjacent the other end thereof, a cylindrical cam having a groove engageable with said follower, and means for rotating said cam, said cam and follower being constructed and arranged to cause said bell crank to reciprocate about said fulcrum during revolution of the cam thereby causing said cutting blade to intermittently cut a segment from the end of said elongate strip, said feeding means comprising a feed roll and a presser roll which yieldably grip said strip, a ratchet wheel attached to said feed roll and rotatable therewith, a pinion mounted for rotation in both directions adjacent said ratchet wheel, a pawl mounted on said pinion and engageable with the teeth of said ratchet wheel during rotation of the pinion in one direction only, a rack having teeth engageable with the teeth of said pinion, a link pivotally attached to said rack, a shaft mounted for rotation in both directions about its axis, two arms one attached to each end of said shaft and extending radially therefrom, a pivotal connection between one of said arms and said link, means to adjust said pivotal connection at different distances on said arm from the axis of said shaft, a second link pivotally connected to the other arm, a pivotal connection between the second link and the end of said cylindrical cam, said pivotal connection being located at a lesser radial distance from the axis of said cam than the radial distance between the axis of said shaft and the pivotal connection between the second link and its adjacent arm, whereby said shaft is rotated back and forth a predetermined number of degrees about its axis during each revolution of said cam, said cam groove and said pivotal connection between the second link and the end of the cam being constructed and arranged to revolve said pinion in the direction in which said pawl is engageable with the teeth of said ratchet wheel while said cutting blade is out of severing engagement with said strip.

HENRY B. LUPIEN.